United States Patent [19]
Brosig et al.

[11] Patent Number: 5,561,540
[45] Date of Patent: Oct. 1, 1996

[54] LIQUID CRYSTAL DISPLAY

[75] Inventors: Stefan Brosig, Stuttgart; Jürgen Waldmann, Schönaich, both of Germany

[73] Assignee: Nokia Technology GmbH, Pforzheim, Germany

[21] Appl. No.: 333,749

[22] Filed: Nov. 3, 1994

[30] Foreign Application Priority Data

Nov. 26, 1993 [DE] Germany .......................... 43 40 271.2

[51] Int. Cl.⁶ .................... G02F 1/1335; G02F 1/1337; G02F 1/13
[52] U.S. Cl. ................................. 359/63; 359/75; 359/76; 359/102
[58] Field of Search .................... 359/63, 75, 76, 359/102

[56] References Cited

U.S. PATENT DOCUMENTS

| | | | |
|---|---|---|---|
| 4,909,605 | 3/1990 | Asano et al. | 350/347 |
| 4,936,654 | 6/1990 | Suzaki et al. | 350/337 |
| 4,974,940 | 12/1990 | Asano et al. | 359/102 |
| 5,048,933 | 9/1991 | Asano | 359/102 |
| 5,376,944 | 12/1994 | Mogi et al. | 345/100 |

FOREIGN PATENT DOCUMENTS

| | | |
|---|---|---|
| 0259822 | 3/1988 | European Pat. Off. . |
| 0282300 | 9/1988 | European Pat. Off. . |
| 0376029 | 7/1990 | European Pat. Off. . |
| 3433248 | 3/1986 | Germany . |
| 3609141 | 9/1987 | Germany . |
| 3822604 | 1/1989 | Germany . |
| 3825697 | 2/1989 | Germany . |
| 3835803 | 4/1990 | Germany . |
| 3911358 | 10/1990 | Germany . |
| 3923750 | 1/1991 | Germany . |
| 4103720 | 8/1991 | Germany . |
| 4107167 | 9/1992 | Germany . |
| 4212744 | 10/1993 | Germany . |

OTHER PUBLICATIONS

Belyaev, V. V.; Chigrinov, V. G. "Figure of merit of liquid--crystal materials for optically addressed spatial modulators." In: Applied Optics, Jan. 1993, vol. 32, No. 2, S. 141–146.

Schoji, Masato, et al. "Improvements in an Achromatic ST-LCD with a Retardation Film": In: Proceedings of the SID, vol. 32, 4, 1991 S–355–359.

JP Patent Abstract of Japan 5–61073A, P–1573, Jul. 13, 1993, vol. 17, No. 372.

JP Patent Abstract of Japan 5–66425 A., P–1576, Jul. 20, 1993, vol. 17, No. 387.

JP Patent Abstracts of Japan 5–40281 A, P–1562, Jun. 23, 1993, vol. 17, No. 332.

(List continued on next page.)

*Primary Examiner*—Wael M. Fahmy
*Assistant Examiner*—Fetsum Abraham
*Attorney, Agent, or Firm*—Ware, Fressola, Van Der Sluys & Adolphson

[57] ABSTRACT

According to the state of the art, LC displays are known whose torsion angle is between about 180° and 300°. Such displays exhibit good independence of angle of view of white impression and contrast, but they are not gray scale capable and are not free of hysteresis. For that reason, the invention presents a display (10) whose product of plate separation (d) and anisotropy of the angle of refraction is equal to or greater than 0.45 and smaller than 0.65 μm, whose torsion angle φ is between 260° and 360°, whose liquid crystal molecules (18) have an approach angle θ between 7° and 25°, and encompass a liquid crystal material between the substrate plates (11) in which the relationship of the elastic constant $K_3$ to the elastic constant $K_1$ is between 1.4 and 0.6. The angular relationships (β, γ) of the polarization directions P.u, P.o with the respective orientation direction η.u, η.o is a function of torsion angle φ. An improvement of the contrast relationships is provided, if the relationship between the upper polarization direction P.o and the lower polarization direction P.u is smaller than 90°.

8 Claims, 5 Drawing Sheets

OTHER PUBLICATIONS

JP Patent Abstracts of Japan 5–27217 A., P–1554, Jun. 11, 1993, vol. 17, No. 305.
JP Patent Abstracts of Japan 5–19231, A., P–1549, Jun. 3, 1993, vol. 17, No. 290.
Patent Abstracts of Japan 4–299308 A., P–1498 Mar. 8, 1993, vol. 17, No. 112.
Patent Abstracts of Japan 4–289818., A., P–1492, Feb. 23, 1993, vol. 17, No. 90.
Patent Abstracts of Japan 4–278929 A., P–1487 Feb. 16, 1993, vol. 17, No. 76.
Patent Abstracts of Japan 4–265948 A., P–1480, Feb. 3, 1993, vol. 17, No. 54.
Patent Abstracts of Japan 4–208921 A., P–1453 Nov. 20, 1992, vol. 16, No. 551.
Patent Abstracts of Japan 4–139420 A., P–1412 Aug. 28, 1992, vol. 16, No. 409.
Patent Abstracts of Japan 4–139419 A., P–1412, Aug. 28, 1992, vol. 16, No. 409.
Patent Abstracts of Japan 4–128716 A., P–1406, Aug. 20, 1992, vol. 16, No. 393.
Patent Abstracts of Japan 3–276125 A., P–1322, Mar. 10, 1992, vol. 16, No. 96.
Patent Abstracts of Japan 2–167528 A., P–1106, Sep. 14, 1990, vol. 14, No. 430.
Patent Abstracts of Japan 2–55319 A., P–1048, May 16, 1990, vol. 14, No. 230.
Patent Abstracts of Japan 1–243021 A., P–979, Dec. 20, 1989, vol. 13, No. 576.
Patent Abstracts of Japan 1–243019 A., P–979, Dec. 20, 1989, vol. 13, No. 576.
Patent Abstracts of Japan A 63–220221 A., P812, Jan. 12, 1989, vol. 13, No. 12.
Patent Abstracts of Japan 63–70233 A., P–743, Aug. 11, 1988, vol. 12, No. 295.
Patent Abstracts of Japan 62–287225 A., P–707, May 25, 1988, vol. 12, No. 175.
Moia, F.: Schadt, M. "New Generation of Neumatic Mixtures for High–Information–Content Supertwist on Actively Addressed Twisted–Neumatic Liquid–Crystal Displays". In: Proceedings of the SID, vol. 32; 4, 1991, S.361–367.
JP Patent Abstract of Japan 5–66425 A., P–1576, Jul. 20, 1993, vol. 17, No. 387.
JP Patent Abstract of Japan 5–61073 A., P–1573, Jul. 13, 1993, vol. 17, No. 372.

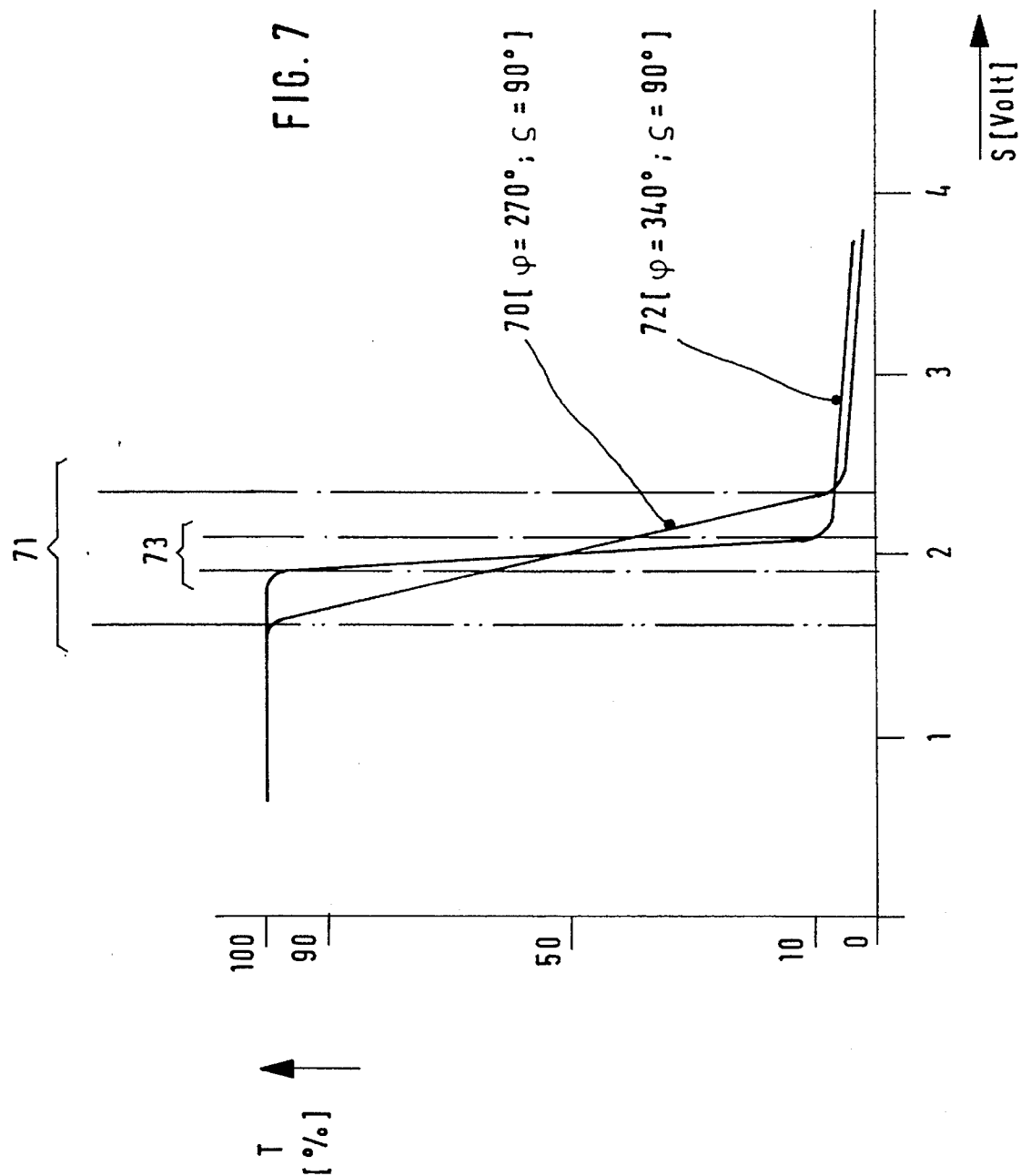

LIQUID CRYSTAL DISPLAY

TECHNICAL FIELD

The invention relates to passively controlled liquid crystal displays, in particular those that are distinguished by the angular field depending less on contrast and white impression.

BACKGROUND OF THE INVENTION

A liquid crystal display with a cell (10) is known from EP 0 282 300. The liquid crystal display described therein is formed by two electrode substrate plates and a rim, which connects the substrate plates by their outer edges and at a distance from each other. The inside space of the cell, which is formed by the two substrate plates and the rim, is filled with a nematic liquid crystal material. Each of the two surfaces of the substrate plates facing the liquid crystal material is provided with an orientation layer. According to EP 0 282 300, these layers are formed of a polyimide-silicone derivative. Before the substrate plates are completed for a cell, the surfaces, that later come in contact with the liquid crystal material of the cell, are subjected to a friction step. This has the effect that, when the molecules of the liquid crystal material come into contact with the surfaces of the orientation layer prepared in this way, at least the molecules that are close to the orientation layer align themselves with their longitudinal axes parallel to the friction direction (hereafter called orientation direction). To obtain a steep electro-optical curve, which is further explained below, it is necessary for the liquid crystal molecules, which are arranged between the two liquid boundaries formed by the orientation layers of a finish-installed cell, to have a high torsion angle (also called twist). Torsion angles between 180° and 300° are indicated in EP 0 282 300, while both configuration examples, however, refer to a torsion angle of 270°. To establish this torsion angle, the two substrate plates that form the display are installed with respect to each other so that the orientation direction of the lower substrate plate forms an angle with the orientation direction of the upper substrate plate, which corresponds to the desired torsion angle. In addition, a chiral dopant is added to the liquid crystal material, to establish the torsion angle of the liquid crystal molecules between the liquid boundaries.

As can be derived from the d/p relationship of about 0.65 (d=plate separation; p=pitch), EP 0 282 300 indicates a relationship between the spontaneous twist-pitch Ps and the adjusted twist-pitch Pc, which is between about 0.3 and about −1.0 according to the formula:

$(Pc-Ps)/Pc$.

EP 0 259 822 explains in greater detail what is meant by spontaneous twist-pitch and adjusted twist-pitch.

However, this document refers to displays whose relationship between spontaneous and adjusted twist-pitch according to the above formula is between 0 and 0.3, thus a display in which the addition of the doping medium produces an overdose with reference to the torsion angle of the molecules between the substrate plates (equal to the values of the above formula, which are positive).

In EP 0 282 300, a polarizer is connected to the respective substrate plate on each side of a cell facing away from the liquid crystal material. The polarization direction of each of the two polarizers is attuned to the orientation direction of the substrate plate, to which it is connected. The angle relationships between the polarization direction and the orientation direction are between 30° and 70° while the angle relationship of the configuration examples is close to 45°.

The effect of a cell constructed in this manner, in relation to the independence of the angle of view of contrast and white impression, is achieved in that the product of plate separation and anisotropy of the angle of refraction Δn of the liquid crystal material is in the range between 0.3 and 0.7 μm, while both configuration examples in EP 0 282 300 refer to values of 0.55 or 0.59 μm.

Whether, or which approach angle (also called pretilt) is assumed by the liquid crystal molecules with respect to the surface of the orientation layers, cannot be found in EP 0 282 300. EP 0 376 029, a document that is also concerned with highly twisted liquid crystal displays of the above described type, indicates valid approach angles that are greater than 7°. Deviating from EP 0 282 300, EP 0 376 029 indicates the product of plate separation and anisotropy of the angle of refraction Δn as smaller than 0.6 μm, where the preferred value range is between 0.35 and 0.45 μm. EP 0 376 029 indicates torsion angles greater than 240°, although it points out that for reasons of contrast, multiples of 90°, therefore 270° and 360° are preferred torsion angles Accordingly, the configuration examples in EP 0 376 029 refer to torsion angles of 270° and 360°. Most of the thus constructed displays, called EVA cells, are neutral in color, i.e. in the transmissive condition of the display, white light emanates from the cell across a wide angle of view, while the cell is black in the non-transmissive condition.

In view of their multiplex rate, the quality of passively controlled liquid crystal displays is generally expressed by the electro-optic curve, where significance is given to the difference in the control voltage, to switch a display between 10 and 90% transmission. In this connection, FIG. 3 of EP 0 376 029 indicates a curve which shows, after correction of the drawing (the percentages of the ordinates do not refer to absorption, but erroneously to transmission), that 10% transmission is achieved with a control voltage of 2.95 volts, and 90% transmission with 2.80 volts. However, these transmission values are only valid when an increasing voltage is used, for example. If one starts with a predetermined control voltage value, and the control voltage decreases, 90 or 10% transmission is achieved with other voltages than if the voltage increases. This can be attributed to the fact that liquid crystal displays with torsion angles somewhat greater than 240° have no equal relationship of the determined transmission values with reference to increasing and decreasing control voltage values. In other words, liquid crystal displays of this type, and with torsion angles somewhat greater than 240°, are no longer free of hysteresis To eliminate the hysteresis problem, it is known from EP 0 376 029 to adjust the relationship between the elastic constant $K_3$ and the elastic constant $K_1$ to a value between 0.9 and 1.5. These indications are only valid for displays whose Pc to Ps relationship is between 0 and 0.3, determined by the above formula, thus exhibiting excess doping with reference to the torsion angle of the molecules in the plate condition. It should further be pointed out that with a display according to EP 0 259 822, no black-white display is possible while maintaining the approach angle of about 30° mentioned in the configuration examples, only switching between color contrasts.

Furthermore, with highly twisted cells (torsion angle greater than about 240°) it is not possible to produce gray scales in a simple manner, that is, for example to obtain pixel control that permits assigning a determined transmission value to each control voltage value with increasing control voltage.

See FIG. 4 for an explanation in greater detail of the last two aspects (hysteresis and gray scale problems), which schematically illustrates the relationship between the control voltage and the determined transmission of a liquid crystal display with a torsion angle of 270° according to the state of the art (EP 0 376 029). If a control voltage is applied to the electrodes of this liquid crystal display, a transmission value is assigned to each voltage value up to about 2.4 volts, as clearly shown by line 40*a*. If the voltage is further increased to about 2.5 volts, the transmission drops vertically from about 75% to about 5%. This is illustrated by the dash-dotted line 41. The arrow pointing downward next to line 41 makes it clear that line 41 indicates the relationship between increasing control voltage and transmission. If the control voltage is increased above 2.5 volts, the relationship between increasing control voltage and transmission turns to the right, along line 40*b*. In the inverse case, namely when a control voltage of about 3 volts is applied to the electrodes of the liquid crystal display and the control voltage is reduced, a transmission value is assigned to each voltage value up to about 1.6 volts, as illustrated by line 40*b*. If the control voltage is further reduced to about 1.5 volts, a sudden increase from about 25% to about 95% takes place in the transmission. This is shown by the vertical broken line 42 which runs upward. The arrow left of line 42 pointing upward makes it clear that line 42 applies to decreasing control voltages. If the control voltage is reduced to below 1.5 volts, the relationship between transmission and control voltage turns to the left, along line 40*a*.

This phenomenon can be attributed to the fact that, with an increase in the torsion angle, the calculated curve takes a more S-shaped form. Such an S-shaped curve is shown in FIG. 4, and is composed of lines 40*a*, 40*b* and 40*c*. Complicated measures, or measures that deteriorate the display, are known to still provide gray scale capability to such liquid crystal displays, whose curves correspond to the type shown in FIG. 4.

Thus, for example, a pixel intended for display can be subdivided into 4×4 subpixels, for example. Sixteen gray scales are possible with the corresponding switching of these subpixels. Aside from the poor resolution of such displays, these measures are subject to limits created by the producibility of such displays.

Another possibility of creating gray scales with highly twisted liquid crystal displays consists in drastically reducing the switching time between light passage and blocked light passage per unit of time, because the more frequent switching that takes place between a light and dark condition during a unit of time, the more gray scales are possible. In view of the relationships known today, it seems that if the picture repeatability rate is at 50 Hz for example, shortening the switching times seems to be very costly at least, if not altogether impossible.

For that reason, the invention has the task of indicating a liquid crystal display, which permits the imaging of gray scales in a simple manner, with extraordinarily low dependence of the contrast and the white impression on the angle of view, or in which a clear relationship exists between control voltage and transmission.

SUMMARY OF THE INVENTION

This task is fulfilled by a liquid crystal display where the torsion angle of the liquid crystal molecules is between 260° and 360°, that the liquid crystal is underdoped, thus indicating a relationship of Pc and Ps, according to the above formula, that is smaller than or equal to 0 and larger than or equal to −0.6, that the product of plate separation and anisotropy of the angle of refraction $\Delta n$ is larger than or equal to 0.45 and smaller than 0.65 μm, that the approach angle is between 7° and 25° and that the relationship of the elastic constant $K_3$ to the elastic constant $K_1$ in the liquid crystal material is between 1.4 and 0.6.

The invention is based on considerations of the slope of the electro-optical curve. In this connection, slope of the curve comprises the effect of control voltage on the transmission. The significant criterion for the steepness of the curves is the voltage difference between two values, which must be passed through to switch the transmission between 10% and 90% or between 90% and 10%. Accordingly, a display with a steep electro-optical curve includes one that permits switching between 10% and 90% or 90% and 10% with a small voltage difference.

To increase the steepness of the curve, it is known to increase the twist of the liquid crystal molecules between the plates. However, a certain approach angle of the molecules with respect to the surface of the substrate plate is required, to stabilize the twist of the molecules. But larger approach angles cause the curve to flatten. Furthermore, the relationship of the elastic constant $K_3$ to the elastic constant $K_1$ in the liquid crystal material being used, has an effect on the steepness of the curve. Here it is known that, with increased twisting of the liquid crystal molecules between the plates, together with an increase in the relationship of the $K_3$ value to the $K_1$ value, the curve becomes steeper.

It is therefore even more surprising, in view of the fact that the expert always tries to produce as steep a curve as possible by using the above cited measures, that a decrease in the relationship of $K_3$ to $K_1$ causes sufficiently steep curves to be achieved, and also a clear relationship of each voltage value to a transmission value takes place, irrespective of whether increasing or decreasing control voltages are used.

It should already be pointed out in this connection, that the relationship of Pc and Ps according to the above formula, for a torsion angle close to 260°, is between about −0.53 and −0.33, and for a torsion angle of about 320°, between −0.39 and −0.25.

If, according to claim 2, the torsion angle is between 300° and 360° with respect to a display with a torsion angle of only 270° a drastic improvement of the independence of the angle of view of the contrast and the white impression is achieved, without the occurrence of contrast weaknesses with intermediate values that do not correspond to multiples of 90°.

If the dielectric constant in the liquid crystal material is adjusted so that the relationship of $\Delta\epsilon$ to $\epsilon\perp$ is between 1.6 and 3.2, the effect caused by the reduction of the $K_3$ to the $K_1$ value is further strengthened. Thus it was discovered that with relationship values of $\Delta\epsilon$ to $\epsilon\perp$, which are within the value range of claim 3, clearly better curves can be achieved than if the relationship values are outside of the range indicated in claim 3. However, this does not mean that the gray scale capability of a display does not exist if the relationship of $\Delta\epsilon$ to $\epsilon\perp$ is not within the range of 1.6 and 3.2.

Such a liquid crystal display can have a torsion angle $\phi$ of 310°, that the angle of incidence $\Theta$ is 12°, and that the relationship of $K_3$ to $K_1$ is equal to or smaller than 1.1 or can have a torsion angle $\phi$ of 310°, that the angle of incidence $\Theta$ is 15°, that the relationship of $K_3$ to $K_1$ is equal to or smaller than 1.2. Such liquid crystal displays show the relationships between the approach angle and the $K_3$ to $K_1$ relationship, without losing the gray scale capability and the freedom from hysteresis of the display.

A liquid crystal display can have a torsion angle φ of 340°, that the angle of incidence Θ is 22°, and that the relationship of $K_3$ to $K_1$ is smaller than 1.0. Such a liquid crystal display shows that smaller $K_3$ to $K_1$ relationships are required for an increasing torsion angle.

A liquid crystal display can have a polarization direction (P.u) of the lower polarizer (19.u) forming an angle β according to the formula $$\beta \geq 45° + (\alpha°/2)$$

with the orientation direction (η.u) of the lower substrate plate (11.u), where α° is the difference between the actual torsion angle φ of the display (10) and 270°, that the polarization direction (P.o) of the upper polarizer (19.o) forms an angle γ according to the formula $$\gamma \leq 45° - (\alpha°/2)$$

with the orientation direction (η.o) of the upper substrate plate (11.o), where α° is the difference between the actual torsion angle φ of the display and 270°, and that the angle ζ between the polarization direction (P.u) of the lower polarizer (19.u) and the polarization direction (P.o) of the upper polarizer (19.o) is equal to or smaller than 90°. Such a display shows the relationship between the polarization and the orientation direction of each substrate plate, as a function of the torsion angle of the molecules in the plate separation, which, when maintained, produces especially good contrast relationships.

A liquid crystal display can have an angle ζ smaller than 90°, and the angular change from β to β' is equal to the angular change from γ to γ'. Such a display has a transmission of close to 0% when, the angle between the polarization direction of the upper and lower substrate plate is smaller than 90°, and the angular change from the upper and lower 90° polarization direction is the same for both polarization directions.

BRIEF DESCRIPTION OF THE DRAWINGS

FIG. 7 is another depiction of FIG. 3.

BEST MODE FOR CARRYING OUT THE INVENTION

Figure 1:
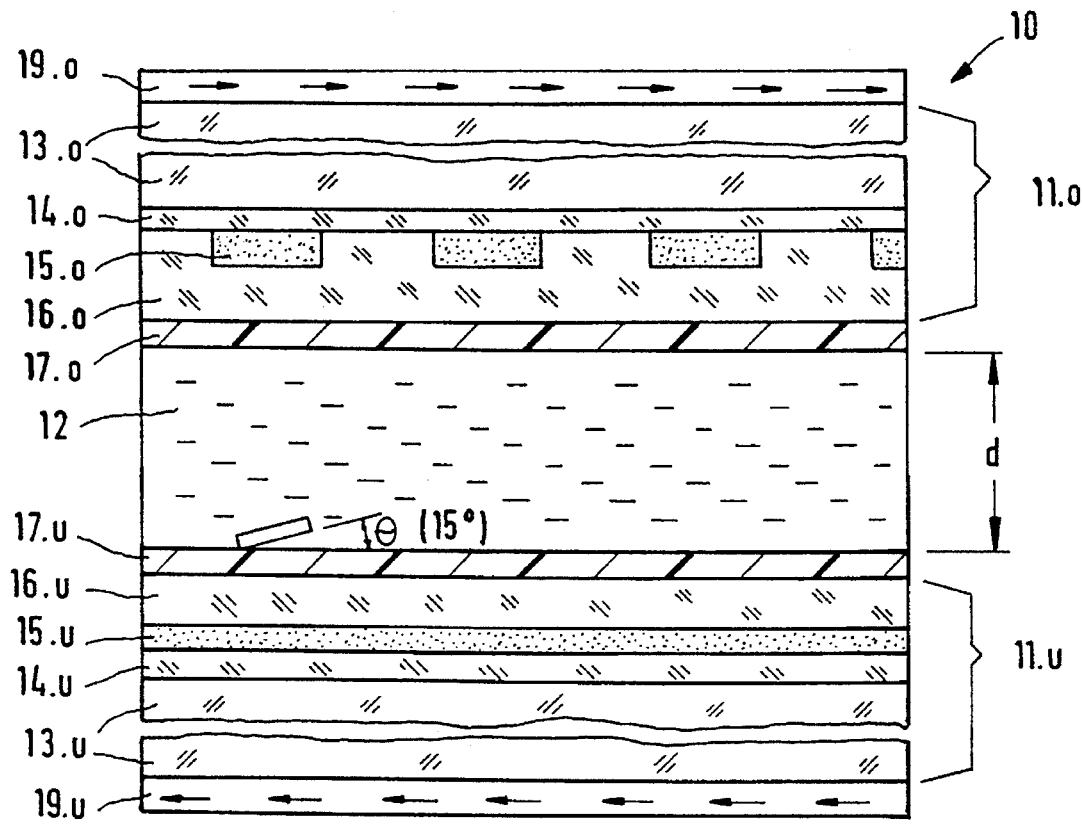
FIG. 1 is a schematic cross section of a liquid crystal display.

FIG. 1 shows a liquid crystal display 10, which is not drawn to true scale for ease of viewing. Thus, the upper substrate plate 11.o and the lower substrate plate 11.u and the liquid crystal layer 12 are depicted with equal thickness, even though the thickness of the substrate plates 11.u and 11.o is about 1.1 mm and, by contrast, the thickness d of the liquid crystal layer measures only 4 micrometers. Each of these substrate plates 11.u, 11.o is built by a cell plate 13.u, 13.o, a barrier layer 14.u, 14.o, an electrode layer 15.u, 15.o with structured ITO electrodes, and an insulation layer 16.u, 16.o, which, like the barrier layer 14.u, 14.o, consists of $SiO_2$. FIG. 1 clearly illustrates the sequence of the layers 14 to 16 on the plates 13 with respect to the liquid crystal layer 12. An orientation layer 17.u, 17.o is formed on each side of the insulation layers 16.u, 16.o, which face the liquid crystal layer 12. These orientation layers 17, which are usually made of an organic polymer material, are presently made of polyimide. Before assembling both substrate plates 11 to a liquid crystal display 10, these layers 17 are treated by tempering and rubbing, so that the longitudinal axes of the liquid crystal molecules 18 are parallel to the orientation direction η.u, η.o (FIG. 2) of the respective orientation layer 17.u, 17.o, in addition to assuming an approach angle θ with the surface of the orientation layers 17. FIG. 1 illustrates what is understood by an approach angle θ of the liquid crystal molecules 18, by means of a molecule 18 in the lower orientation layer 17.o. This illustration clearly shows that the approach angle of the liquid crystal molecule 18 is 15° in the configuration example of FIG. 1.

Each cell plate 13 has a polarizer 19.u, 19.o on the side that faces away from the liquid crystal layer 12, i.e. the upper cell plate 13.o has an upper polarizer 19.o, and the lower cell plate 13.u has a lower polarizer 19.u. The polarization directions of both polarizers 19 are indicated schematically by corresponding arrows. How the polarization directions run in actuality is further explained in conjunction with FIG. 2.

Figure 2:
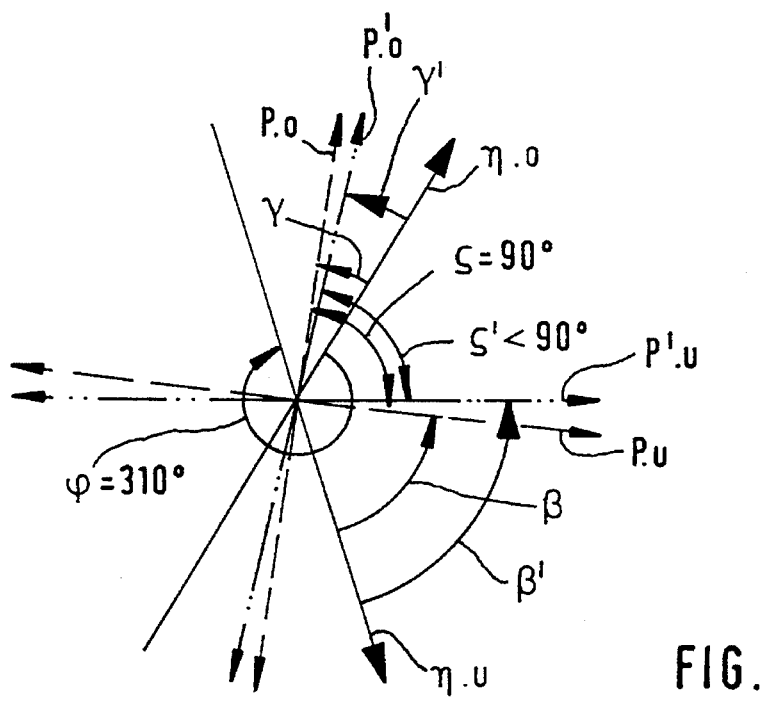
FIG. 2 is a schematic top view of a liquid crystal display, to explain angles between orientation and polarization directions.

The liquid crystal used in the configuration example of FIGS. 1 and 2 is a nematic material, which consists of one part ZLI 5500-050 from the Merck Company in Darmstadt, Germany and two parts ZLI 3243 from the same manufacturer. The properties of these single liquid crystals can be found in the following table:

|  | ZLI 5500-050 | ZLI 3243 |
| --- | --- | --- |
| Δn | 0.1405 | 0.1432 |
| Δε/ε⊥ | 2.25 | 2.0 |
| Δε | 8.55 | 8.4 |
| $K_3$ to $K_1$ | 1,18 | 0.74 |
| Viscosity in $nm^2$/sec. | 19 | 36 |

A chiral dopant named ZLI 4572 from Merck, Darmstadt, is added to each of the above named individual components, where the portion of ZLI 4572 in the liquid crystal ZLI 5500-050 is 0.557%, and 0.571% in the liquid crystal ZLI 3243. The concentration of the mixture is therefore 0.530%. In the configuration example explained in conjunction with FIGS. 1 to 3, this doping adjusts the relationship between the spontaneous and the adjusted twist-pitch to about −0.35.

Since, as already explained, the thickness d of the liquid crystal layer 12 is 4 micrometers, and the anisotropy of the angle of refraction of the above mixture is about 0.142, the product of the plate separation and anisotropy of the angle of refraction is about 0.56 micrometers. Combining the two known commercial liquid crystal mixtures modifies the liquid crystal used in the liquid crystal layer 12, so that the relationship of the elastic constant $K_3$ to the elastic constant $K_1$ is approximately between 1.1 and 0.80.

The following should also be pointed out in connection with FIG. 1. There is no need for a barrier layer 14.u, 14.o if it has been ensured that no sodium ions can diffuse from the cell plates 13.u, 13.o into the ITO layer or the orientation layer 17. The latter can be ensured by using sodium-free glass plates as the cell plates 13. Nor is the invention limited to the use of organic polymer material (such as for example polyimide or polyphenylene) for the orientation layers. Rather, in cases where particularly high approach angles θ are required, the orientation layers 17 can be formed of SiO, which has been vapor-deposited at an angle.

Furthermore, the liquid crystal molecules 18 in the liquid crystal layer 12 formed between orientation layers 17.u, 17.o, are twisted at a torsion angle φ of 310° to the right when viewed from above, thus counterclockwise. However, this only applies as long as no control voltage is applied to the electrodes in the two electrode layers 15.u, 15.o. If an electrical field affects the liquid crystal molecules 18 in the liquid crystal layer 12, they take a parallel position thereto, which removes the twist.

FIG. 2 shows in greater detail the angular relationships that exist between the orientation direction η.u, η.o and the polarization direction P.u, P.o, for a liquid crystal display 10 according to FIG. 1. It can clearly be seen in FIG. 2 that when directly viewing the display 10, the orientation direction η.o on the upper substrate plate 11.o forms a torsion angle φ of 310° with the orientation direction η.u on the lower substrate plate 11.u, and twists to the right, i.e. counterclockwise from the upper plate 11.o to the lower plate 11.u. The angular relationship of the orientation direction η.o on the upper plate 11.o to the polarization direction P.o on the upper plate 11.o is marked by γ, while β indicates the angular relationship between the orientation layer η.u on the lower plate 11.u, and the polarization direction P.u on the lower plate 11.u. The following formulas produce applicable values for β and γ:

$$\gamma \leq 45° - \alpha°/2$$

$$\beta \geq 45° - \alpha°/2$$

where the value α° is the result of the relationship $$\alpha° = \phi° - 270°.$$

For the display 10 shown in FIG. 1, which has a torsion angle φ of 310° this means that α is equal to 40°. Therefore γ is equal to or smaller than 25° and β is equal to or larger than 65°.

If the control voltage is applied to such a cell 10, the cell switches from the transmissive condition into the non-transmissive condition, while it removes the twist of the liquid crystal molecules 18 between the plates 11.

Figure 3:
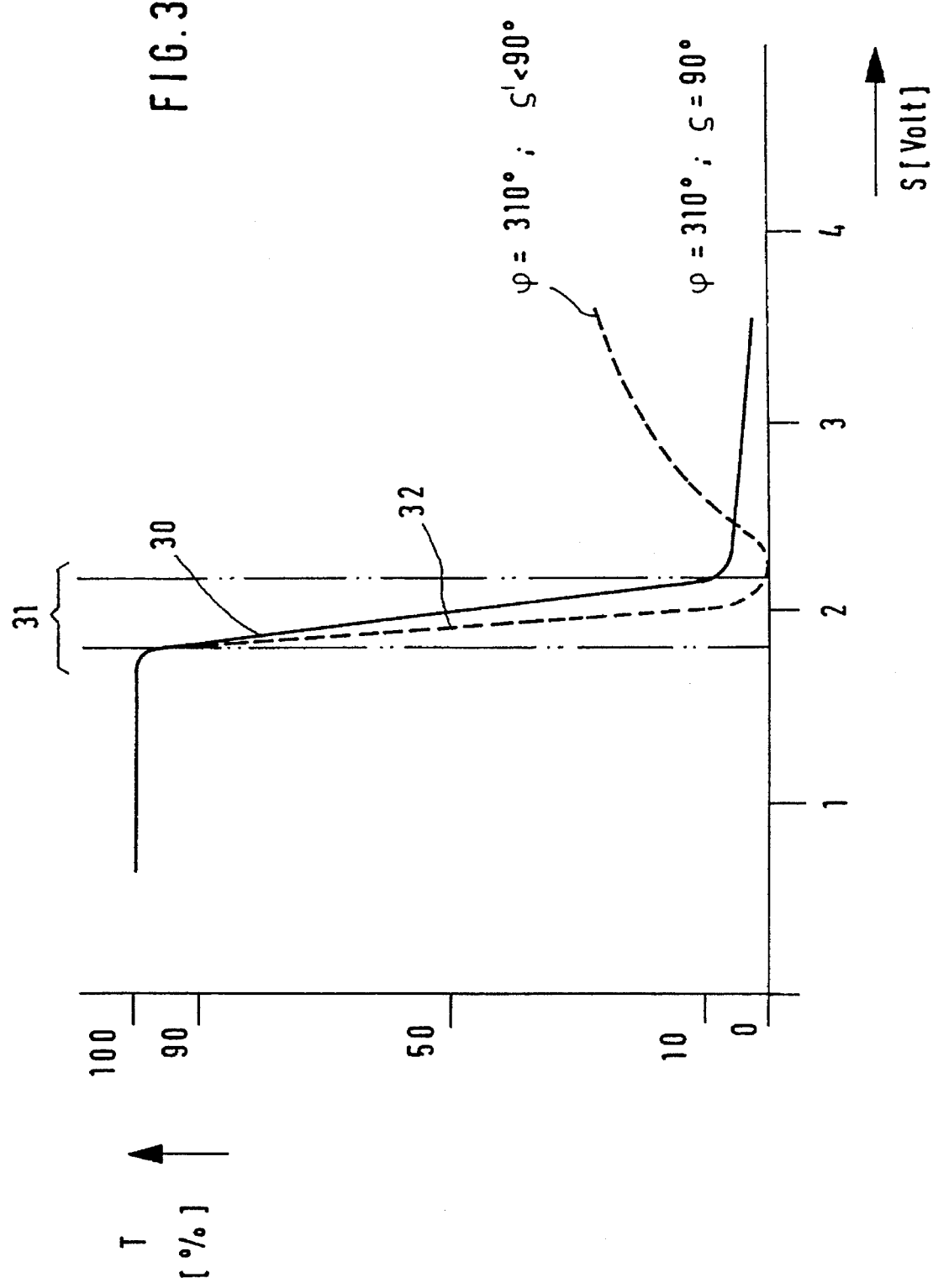
FIG. 3 is a diagram in which the transmission course is indicated with respect to voltage.

This switching is explained in more detail in FIG. 3, which is a diagram depicting the course of transmission with respect to voltage. This diagram clearly shows that the electro-optical curve 30 runs parallel to the abscissa up to a control voltage of about 1.9 volts, and drops steeply downward between about 1.9 and 2.1 volts, and then asymptotically approaches the abscissa from about 2.1 volts on. The point on curve 30 at which it passes to the asymptotic stage is at about 5% transmission, and was measured for a display 10 according to the FIGS. 1 and 2. The polarization directions P.u, P.o form an angle ζ of 90°. By reducing the angle ζ to ζ' of 80° within the value limits for β and γ, a line 32 was established for the curve, in which almost no transmission could be detected at a control voltage of 2.1 volts. This improvement in contrast, caused by the reduction of angle ζ to ζ', was achieved by reducing the angle γ by an amount of 5°, and increasing the angle β by the same amount (=5°). If only a polarization direction P.u, P.o is turned from its 90° relationship with the other polarization direction P.u, P.o, to adjust the angle ζ' to 80° the contrast improvement is not as good as with a symmetrical change of the polarization directions P.u' P.o' of both polarizers 19.u, 19.o.

Figure 4:
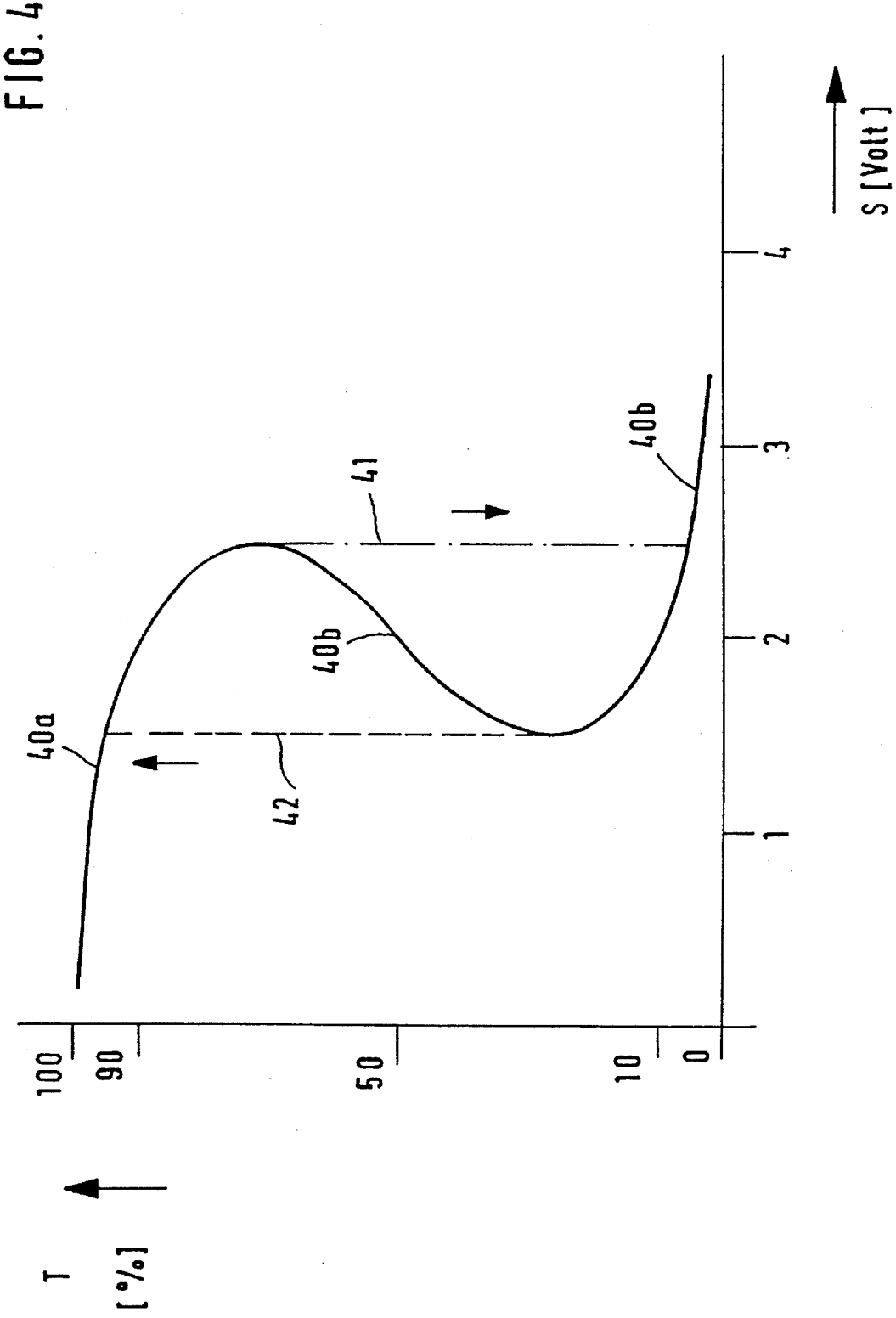
FIG. 4 is another schematic diagram according to FIG. 3, but according to the state of the art.

However, the area 31 of curves 30, 32 is essential for the gray scale capability of highly twisted liquid crystal displays 10. Maintaining the relationship of $K_3$ to $K_1$ in the liquid crystal shows that, in conjunction with the configuration example illustrated in FIGS. 1 and 2, with increasing control voltage in area 31 (between 1.9 and 2.1 volts), the curves do not drop vertically, as shown in FIG. 4 by lines 41 and 42, but decrease steadily.

Accordingly, with increasing control voltage in area 31, a transmission value is clearly assigned to each individual voltage value, so that the display must be seen as gray scale capable.

This steady course of curves 30, 32 does not only apply for the case of increasing, but also for the case of decreasing control voltage, i.e. for the case when a starting control voltage of 2.1 volts is reduced to about 1.9 volts. Because of this behavior of display 10 with respect to increasing and decreasing control voltages, the display 10 shown in FIGS. 1 and 2 can be characterized as free of hysteresis.

If an arrangement according to FIGS. 1 to 3 is to exhibit suitable switching times for a multiplex operation, it is important to use liquid crystal in which the layer 12 has low viscosity. With the liquid crystal ZLI 3243 used in the mixture, an operation of this kind, which is also applicable for television, is only conditionally possible. However, a multiplex operation can also be performed if liquid crystal ZLI 5500-050, for example, is mixed with another liquid crystal that corresponds to ZLI 3243 because of its other values, but exhibits a lower viscosity than 36 mm²/sec.

If a liquid crystal display 10 according to FIGS. 1 and 2 is changed in such a way, that only the approach angle θ of the liquid crystal molecules 18 is reduced from 15° to 12°, the result is a curve line that deviates from the curve line 30, 32 in FIG. 3. However, the curve lines 30, 32 of FIG. 3 are obtained if, as a further measure, a liquid crystal is used in layer 12, which in contrast to display 10 with an approach angle θ of 15° (FIGS. 1 to 3) has a smaller relationship of $K_3$ to $K_1$.

Figure 5:
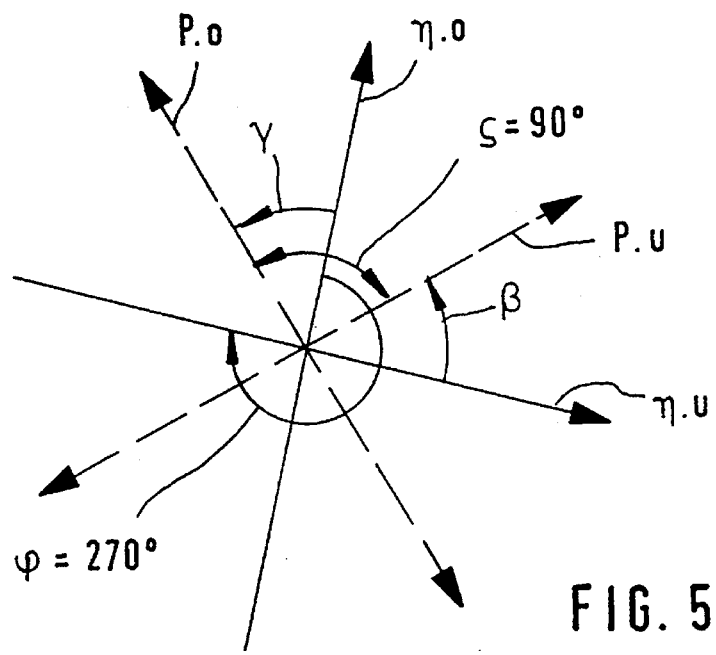
FIG. 5 is another depiction of FIG. 2.

FIG. 5 depicts a liquid crystal display 10 according to FIG. 1, which has a torsion angle of 270° and in which the liquid crystal molecules have an approach angle θ of 12°. The angular relationships of the polarization directions P.u, P.o to the respective orientation directions η.u, η.o correspond to the formulas indicated earlier. Both polarization directions P.u, P.o enclose an angle ζ of 90°. The liquid crystal being used has a $K_3$ to $K_1$ relationship of 1.25. The relationship of Δε to ε⊥ is 2.2. A liquid crystal 12 comprising these characteristics can be obtained commercially from Merck in Darmstadt under the name of ZLI-5525-50. 0.45% of the Merck dopant ZLI-4572 is added to the liquid crystal 12. The relationship of Pc and Ps according to the earlier formula is −0.4. The product of the plate separation ( d=3.8 μm) and the anisotropy of the angle of refraction (Δn=0.14) amounts to 0.532 μm.

FIG. 7 illustrates the electro-optical properties of a display 10 that is produced in this manner. This FIG. 7 clearly illustrates that the curve 70 in area 71 (1.75 to 2.25 volts) exhibits a steady course as a function of control voltage. This relationship applies to both increasing as well as decreasing control voltages, in other words, such a display is free of hysteresis.

Figure 6:
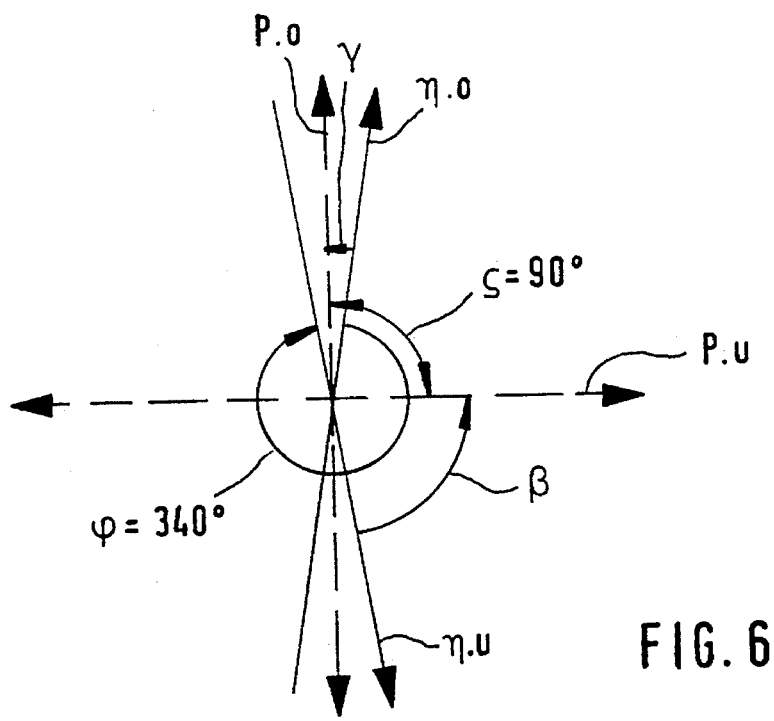
FIG. 6 is another depiction of FIG. 2.

Reference 72 in FIG. 7 illustrates a curve line for a display 10, whose torsion angle φ is 340° whose liquid crystal molecules have an approach angle θ of 22° due to the polyphenylene orientation layers 17, whose polarization directions P.u, P.o have angular relationships to the orientation directions η.u, η.o in accordance with the above formula, and whose polarization directions P.u, P.o enclose an angle ζ of 90° with each other. The last named angular relationships are illustrated in greater detail in FIG. 6. The liquid crystal used was such, that it had a $K_3$ to $K_1$ relationship of less than 1.0. A liquid crystal that has these characteristics is the already cited liquid crystal ZLI 3243. The chiral doping causes the relationship of Pc and Ps—calculated according to the above formula—to be about −0.3. FIG. 7 shows that the curve line 72 of a display 10 according to FIG. 6, compared to a curve line 70 of a display 10 according to FIG. 5, can be changed from 10% to 90%, or from 90% to 10% of transmission in a much narrower area 73. The result is that a display 10 according to FIG. 6, compared to a display 10 according to FIG. 5, allows a higher multiplex rate. However, since area 73 is much narrower, and the voltage changes in area 73 cannot be reduced in any desired manner, the number of producible gray scales in a display 10 according to FIG. 6 is somewhat less than as compared to a display 10 according to FIG. 5.

In addition, it should be pointed out that—as already explained in connection with FIG. 3—even with displays 10 according to FIGS. 5 and 6, the contrast relationships can be improved by a reduction of the angle ζ to ζ' (not shown in FIG. 7).

It should further be stated that the positive effects depicted in this application by displays turning to the right, also apply for displays turning to the left, if the angular relationships that are applicable to right turning displays are the mirror images of these, applied to the left turning displays. As already indicated earlier, right turning displays are those, in which the screw rotation of the liquid crystal molecules 18 runs clockwise from the upper plate 11.o to the lower plate 11.u.

We claim:

1. A liquid crystal display, having a cell (10) consisting of two electrode substrate plates (11.u, 11.o), whose facing surfaces have an orientation layer (17.u, 17.o), having two crossed polarizers (19.u, 19.o), having a layer of liquid crystal (12) made of nematic liquid crystal material, which is enclosed by the two substrate plates (11.u, 11.o) and a rim, where molecules (18) of the liquid crystal material are aligned parallel to an orientation direction (η.u, η.o) of the orientation layer (17.u, 17.o) forming a predetermined angle of incidence Θ with the orientation layer (17.u, 17.o), and a torsion angle φ caused by chiral doping being defined between the facing surfaces of the orientation layers (17.u, 17.o) of the two substrate plates (11.u, 11.o), characterized in that a product of a plate spacing (d) and an anisotropy of an index of refraction Δn is larger than or equal to 0.45 μm and smaller than 0.59 μm, a relationship between a spontaneous Twist-Pitch Ps and an adjusted Twist-Pitch Pc is defined as:

$-0.2 \geq (Pc-Ps)/Pc \geq -0.4$ the torsion angle φ is between 310° and 340°, the angle of incidence Θ is between 7° and 25°, and in the liquid crystal material, a relationship between an elastic constants $K_3$ and an elastic constants $K_1$ is between 1.4 and 0.6.

2. A liquid crystal display according to claim 1, characterized in that the torsion angle φ is greater than 300°.

3. A liquid crystal display according to claim 2, characterized in that the relationship in the liquid crystal material between Δε and Δ⊥ is between 1.6 and 3.2, where ε⊥ is the dielectric constant vertical to the longitudinal axis of the liquid crystal molecules (18), and Δε is the result of subtracting ε⊥ from the dielectric constant parallel to the longitudinal axis of the liquid crystal molecules (18).

4. A liquid crystal display according to claim 1, characterized in that the polarization direction (P.u) of the lower polarizer (19.u) forms an angle β according to the formula

β≧45°+(α°/2)

with the orientation direction (η.u) of the lower substrate plate (11.u), where α° is the difference between the actual torsion angle φ of the display (10) and 270°, that the polarization direction (P.o) of the upper polarizer (19.o) forms an angle γ according to the formula

γ≦45°−(α°/2)

with the orientation direction (η.o) of the upper substrate plate (11.o), where α° is the difference between the actual torsion angle φ of the display and 270°, and that the angle ζ between the polarization direction (P.u) of the lower polarizer (19.u) and the polarization direction (P.o) of the upper polarizer (19.o) is equal to or smaller than 90°.

5. A liquid crystal display according to claim 4, characterized in that the angle ζ is smaller than 90°, and the angular change from β to β' is equal to the angular change from γ to γ', where β indicates the angular relationship between the orientation direction (η.u) on the lower plate (11.u), and the polarization direction (P.u) on the lower plate (11.u), where β' indicates the angular relationship between the orientation direction (η.u) on the lower plate (11.u), and a changed polarization direction (P.u') on the lower plate (11.u), and where γ' indicates an angular relationship between a changed polarization direction (P'.o) of the upper polarizer (19.o) and the orientation direction (η.o) of the lower substrate plate (11.o).

6. A liquid crystal display having a cell (10) consisting of two electrode substrate plates (11.u, 11.o), whose facing surfaces have an orientation layer (17.u, 17.o), having two crossed polarizers (19.u, 19.o), having a layer of liquid crystal (12) made of nematic liquid crystal material, which is enclosed by the two substrate plates (11.u, 11.o) and a rim, where molecules (18) of the liquid crystal material are aligned parallel to an orientation direction (η.u, η.o) of the orientation layer (17.u, 17.o) forming a predetermined angle of incidence Θ with the orientation layer (17.u, 17.o), and a torsion angle φ caused by chiral doping being defined between the facing surfaces of the orientation layers (17.u, 17.o) of the two substrate plates (11.u, 11.o), characterized in that a product of a plate spacing (d) and an anisotropy of an index of refraction Δn is larger than or equal to 0.45 μm and smaller than 0.65, a relationship between a spontaneous Twist-Pitch Ps and an adjusted. Twist-Pitch Pc is defined as:

$0 \geq (Pc-Ps)/Pc \geq -0.6$, the torsion angle φ is 310°, the angle of incidence Θ is 12°, and in the liquid crystal material, a relationship between $K_3$ to $K_1$ is equal to or smaller than 1.1.

7. A liquid crystal display having a cell (10) consisting of two electrode substrate plates (11.u, 11.o), whose facing surfaces have an orientation layer (17.u. 17.o), having two crossed polarizers (19.u, 19.o), having a layer of liquid crystal (12) made of nematic liquid crystal material, which is enclosed by the two substrate plates (11.u, 11.o) and a rim, where molecules (18) of the liquid crystal material are aligned parallel to an orientation direction (η.u, η.o) of the orientation layer (17.u, 17.o) forming a predetermined angle of incidence Θ with the orientation layer (17.u, 17.o), and a torsion angle φ caused by chiral doping being defined between the facing surfaces of the orientation layers (17.u, 17.o) of the two substrate plates (11.u, 11.o), characterized in that a product of a plate spacing (d) and an anisotropy of an index of refraction Δn is larger than or equal to 0.45 μm and smaller than 0.65, a relationship between a spontaneous Twist-Pitch Ps and an adjusted Twist-Pitch Pc is defined as:

$$0 \geq (Pc-Ps)/Pc \geq -0.6,$$

the torsion angle φ is 310°, the angle of incidence Θ is 15°, in the liquid crystal material, a relationship between $K_3$ to $K_1$ is equal to or smaller than 1.2.

8. A liquid crystal display having a cell (10) consisting of two electrode substrate plates (11.u, 11.o), whose facing surfaces have an orientation layer (17.u, 17.o), having two crossed polarizers (19.u, 19.o), having a layer of liquid crystal (12) made of nematic liquid crystal material, which is enclosed by the two substrate plates (11.u, 11.o) and a rim, where molecules (18) of the liquid crystal material are aligned parallel to an orientation direction (η.u, η.o) of the orientation layer (17.u, 17.o) forming a predetermined angle of incidence Θ with the orientation layer (17.u, 17.o), and a torsion angle φ caused by chiral doping being defined between the facing surfaces of the orientation layers (17.u, 17.o) of the two substrate plates (11.u, 11.o), characterized in that a product of a plate spacing (d) and an anisotropy of an index of refraction Δn is larger than or equal to 0.45 μm and smaller than 0.65, a relationship between spontaneous Twist-Pitch Ps and an adjusted Twist-Pitch Pc is defined as:

$$0 \geq (Pc-Ps)/Pc \geq -0.6,$$

the torsion angle φ is 340°, the angle of incidence Θ is 22°, and in the liquid crystal material, a relationship between $K_3$ to $K_1$ is smaller than 1.0.

\* \* \* \* \*

UNITED STATES PATENT AND TRADEMARK OFFICE
CERTIFICATE OF CORRECTION

PATENT NO. : 5,561,540
DATED : October 1, 1996
INVENTOR(S) : Stefan Brosig, et al.

It is certified that error appears in the above-indentified patent and that said Letters Patent is hereby corrected as shown below:

Col. 10, line 57, after "adjusted", --.-- should be deleted.

Col. 10, line 67, delete "(17.u. 17.o)" and insert --(17.u, 17.o)--.

Col. 12, line 1, delete "(19.u, 19,o)" and insert --(19.u, 19.o)--.

Signed and Sealed this

Fifteenth Day of April, 1997

Attest:

BRUCE LEHMAN

Attesting Officer    Commissioner of Patents and Trademarks